(12) United States Patent
Kaushik et al.

(10) Patent No.: US 8,488,516 B2
(45) Date of Patent: Jul. 16, 2013

(54) METHOD FOR IMPROVING QUALITY OF COMMUNICATION IN A COMMUNICATION NETWORK

(75) Inventors: Anil Kaushik, Bangalore (IN); Hari Sharma, Bangalore (IN)

(73) Assignee: Motorola Solutions, Inc., Schaumburg, IL (US)

( * ) Notice: Subject to any disclaimer, the term of this patent is extended or adjusted under 35 U.S.C. 154(b) by 367 days.

(21) Appl. No.: 12/979,437

(22) Filed: Dec. 28, 2010

(65) Prior Publication Data

US 2012/0163281 A1      Jun. 28, 2012

(51) Int. Cl.
*H04B 7/14*      (2006.01)

(52) U.S. Cl.
USPC .......................................... 370/315

(58) Field of Classification Search
USPC ................. 370/229, 312, 315, 328, 332, 243, 370/245, 353, 355; 455/7, 455, 517
See application file for complete search history.

(56) References Cited

U.S. PATENT DOCUMENTS

| | | | |
|---|---|---|---|
| 2006/0293061 A1* | 12/2006 | Kobayashi et al. | 455/455 |
| 2008/0080369 A1* | 4/2008 | Sumioka et al. | 370/229 |
| 2011/0159802 A1* | 6/2011 | Binti Harum et al. | 455/7 |
| 2012/0094707 A1* | 4/2012 | Chen | 455/517 |

\* cited by examiner

*Primary Examiner* — Jeffrey M Rutkowski
*Assistant Examiner* — Syed M Bokhari (57) ABSTRACT

A communication network comprises a plurality of access points, a plurality of stations wirelessly communicating with the plurality of access points and at least one sensor located at a different location from each of the plurality of access points for improving communication quality in the communication network. The sensor in the communication network senses a communication message transmitted from a source station and destined for a destination access point on a wireless communication channel in the communication network. The sensor further determines a number of retransmissions of the communication message from the source station. The sensor, upon determining that the determined number of retransmissions of the communication message is at least equal to a predetermined threshold, forwards the communication message to the destination access point through the wired medium.

13 Claims, 8 Drawing Sheets

SENSOR TABLE FOR ACCESS POINT 110-1

| SOURCE STATION 405-1 | IDENTIFIER OF THE COMMUNICATION MESSAGE 410-1 | NUMBER OF RETRANSMISSIONS OF THE COMMUNICATION MESSAGE 415-1 | STATUS 420-1 |
|---|---|---|---|
| STATION 1 | 2A | 3 | FORWARDED |
| STATION 2 | 1B | 1 | NOT FORWARDED |
| ••• | | | |

FIG. 4A

SENSOR TABLE FOR ACCESS POINT 110-2

| SOURCE STATION 405-2 | IDENTIFIER OF THE COMMUNICATION MESSAGE 410-2 | NUMBER OF RETRANSMISSIONS OF THE COMMUNICATION MESSAGE 415-2 | STATUS 420-2 |
|---|---|---|---|
| STATION 1 | 2C | 0 | FORWARDED |
| STATION 2 | 4D | 4 | NOT FORWARDED |
| ••• | | | |

METHOD FOR IMPROVING QUALITY OF COMMUNICATION IN A COMMUNICATION NETWORK

FIELD OF THE DISCLOSURE

The present disclosure relates generally to a communication network and more particularly to a method for improving quality of communication in wireless communication networks.

BACKGROUND

A wireless communication network can include a plurality of access points communicatively coupled to each other either directly or indirectly over a particular geographical area. Each access point in the communication network provides communication to one or more client stations operating in its coverage area. In particular, whenever a first client station has to send communication messages to a second client station, the first client station sends the communication messages to an access point in the coverage area of the first client station. The access point on receiving the communication message sends back an acknowledgment to the first client station and forwards the communication messages to the second client station. However, if a particular access point is located in a region of radio frequency (RF) interference, there is a high probability that one or more of the communication messages transmitted by the first client station would not reach the access point. The RF interference is a disturbance that arises from nearby radio frequency emitters and may interrupt, drop, or otherwise degrade the quality of the communication between the first client station and the access point as the access point may not receive all communication packets transmitted by the first client station. As the access point is unable to receive all communication packets transmitted by the first client station, the access point also cannot forward all communication messages to the second client station. The effect on the quality of communication in the communication network is more severe when the communication messages transmitted from the first client station to the access point are voice messages. The dropping of the voice messages causes jitter in voice communication that further degrades the quality of voice communication between the first client station and the second client station or between the first client station and the access point.

Thus, there exists a need for a method to prevent dropping of communication messages in the communication network to improve the quality of communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A communication network comprises a plurality of access points, a plurality of stations wirelessly communicating with the plurality of access points and at least one sensor located at a different location from each of the plurality of access points for improving communication quality in the communication network. The sensor in the communication network senses a communication message transmitted from a source station and destined for a destination access point on a wireless communication channel in the communication network. The sensor further determines a number of retransmissions of the communication message from the source station. The sensor upon determining that the determined number of retransmissions of the communication message is at least equal to a predetermined threshold forwards the communication message to the destination access point through the wired medium.

Figure 1:
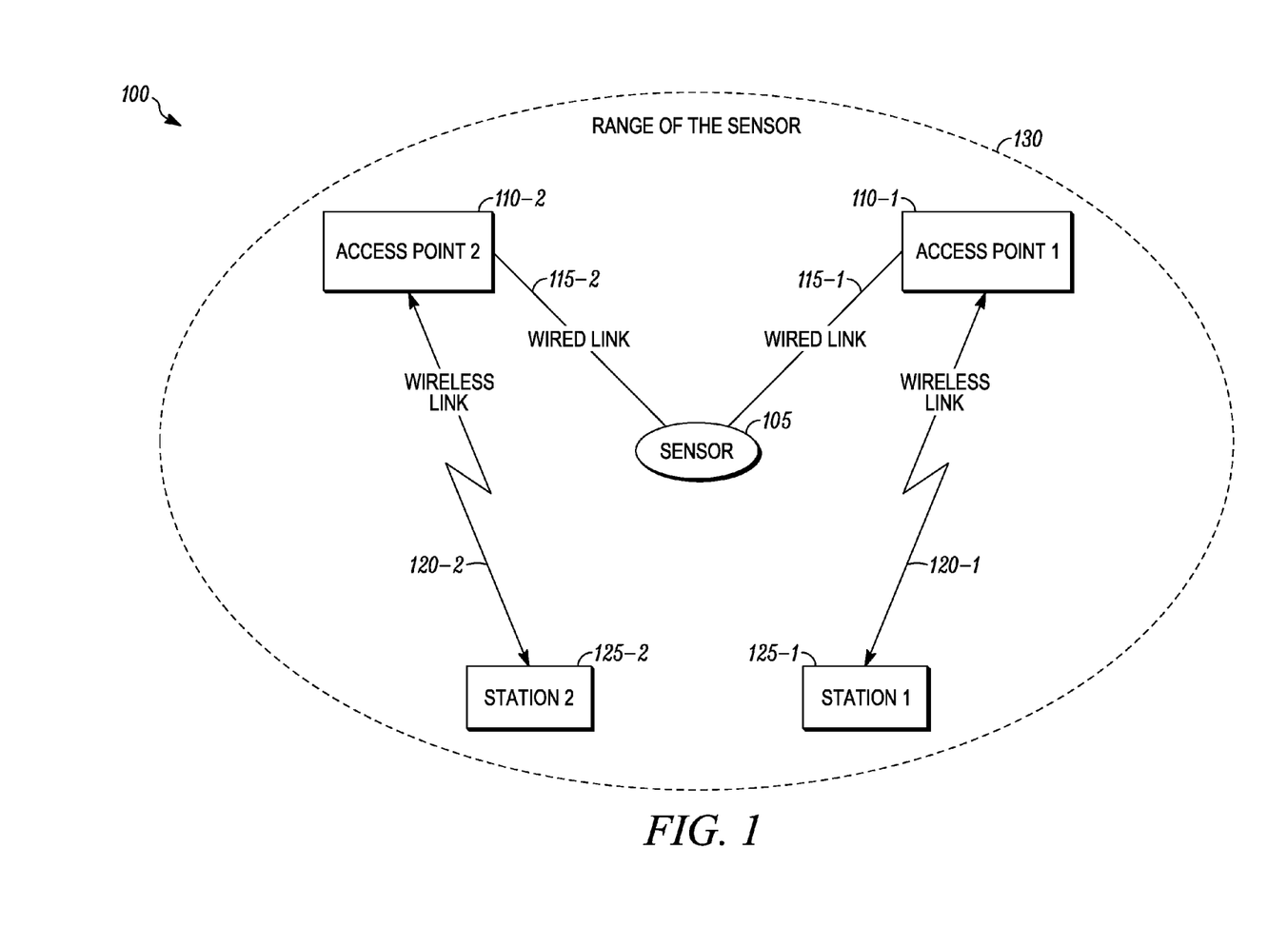
FIG. 1 is a block diagram of a communication network in accordance with some embodiments.

FIG. 1 is a block diagram illustrating a communication network 100 employing a method for improving the quality of communication in the communication network 100 in accordance with some embodiments. The communication network 100 includes a plurality of access points 110-*n*, a plurality of stations 125-*n* wirelessly communicating with at least one access point 110-*n* and at least one sensor 105 in the coverage area of the access points 110-*n* and the stations 125-*n*. Although not shown in FIG. 1, the communication network 100 may include more than one sensor 105. The access points 110-*n* for example, access point 110-1 and access point 110-2 transmit data to and receive data from one or more stations 125-*n* (shown as station 125-1 and station 125-2 in FIG. 1) to enable the stations 125-*n* to communicate with one another as well as with other access points 110-*n*. The access points 110-*n* communicate with the stations 125-*n* via wireless links 120-*n*. Specifically, the access point 110-1 communicates with the station 125-1 via wireless link 120-1 and the access point 110-2 communicates with the station 125-2 via wireless link 120-2. Although not shown in FIG. 1, a person with ordinary skill in the art would appreciate that each of the access point 110-$n$ can communicate with the plurality of stations 125-$n$ in its coverage area. The access points 110-$n$ communicate with each other either via wired or wireless communication links (not shown). In accordance with some embodiments, the access points 110-$n$ are connected to the sensor 105 located at a different location from the access points 110-$n$ through wired links 115-$n$. Specifically, the access point 110-1 is connected to the sensor 105 via wired link 115-1 and the access point 110-2 is connected to the sensor 105 via wired link 115-2.

The sensor 105 is a low power device that is capable of observing the wireless communication traffic within its range. In accordance with some embodiments, the sensor 105 is limited in processing and communication capability as compared to the access points 110-$n$. The sensor 105 communicates directly with the plurality of access points 110-$n$ through wired links 115-$n$. For example, as shown in FIG. 1, the sensor can observe all wireless communication messages in its range 130. In accordance with some embodiments, the communication message can be a data message, a control message, a voice message, or a voice quality data message. The sensor 105 in the communication network 100 operates in a promiscuous mode in which the sensor 105 receives the communication messages communicated within its range 130 irrespective of the source and the destination of the communication message. In accordance with some embodiments, the sensor 105 will act as a relay in addition to the normal functioning and forwards the required packets to the access points 110-$n$. When the sensor 105 senses a communication message transmitted by a source station and destined for a destination access point 110-$n$, the sensor 105 forwards the communication message to the destination access point 110-$n$ through the wired link 115-$n$. In accordance with some embodiments, the sensor 105 forwards the communication message to the destination access point 110-$n$ when the number of retransmissions for the communication message is at equal to or greater than a predetermined threshold value.

The station 125-$n$ can be, for example, one or more types of communication devices, such as mobile telephones, mobile nodes, radio terminals, and notebook computers and personal digital assistants, or the like with communication capabilities. The stations 125-$n$ transmit communication messages to the destination access point 110-$n$ to forward the communication messages to other stations 125-$n$. In accordance with some embodiments, the station 125-$n$ waits for a particular period of time before retransmitting the same communication message to the destination access point 110-$n$. If the station 125-$n$ does not receive any acknowledgment from the destination access point 110-$n$ in that particular time period, the station 125-$n$ would retransmit the communication message to the destination access point 110-$n$.

Figure 2:
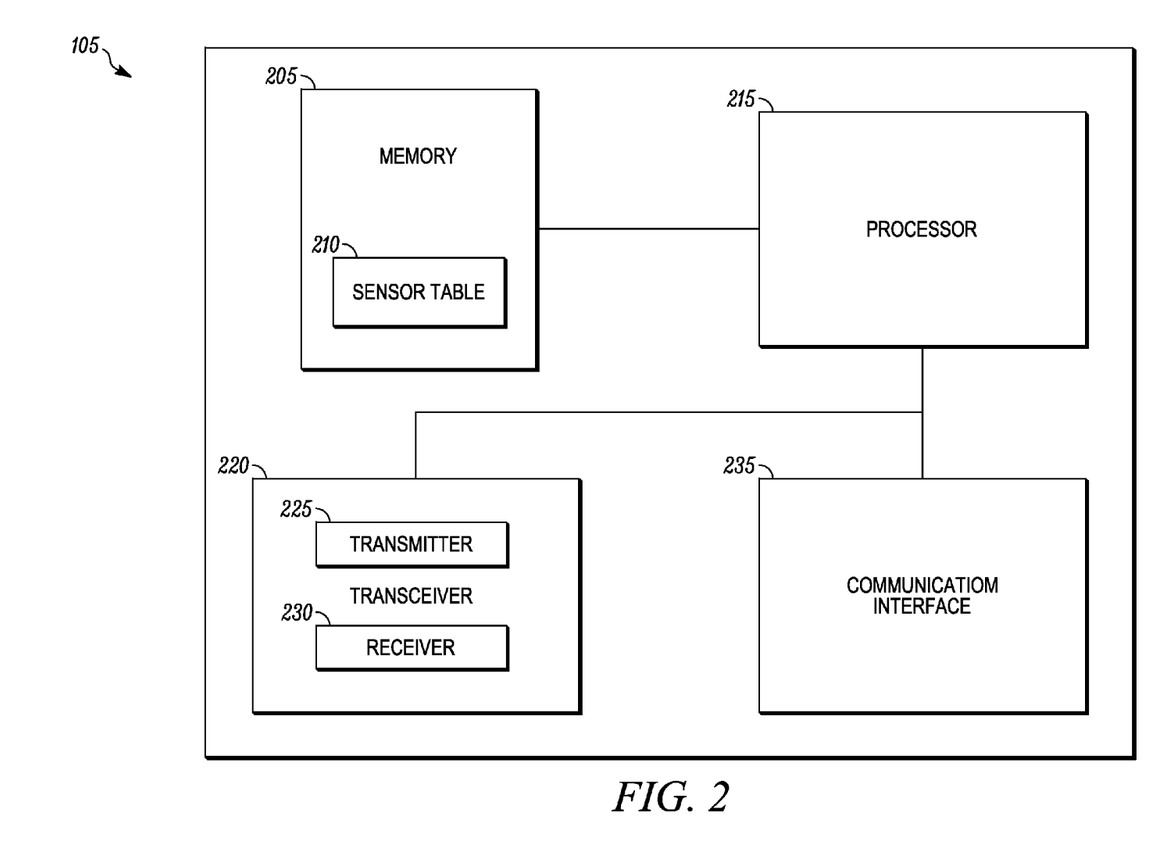
FIG. 2 is a block diagram of a sensor operating in the communication network of FIG. 1 in accordance with some embodiments.

FIG. 2 is a block diagram of the sensor 105 employed in the communication network 100 in accordance with some embodiments. The sensor 105 in the communication network 100 is configured to operate in the promiscuous mode in which it receives the communication messages communicated through its range 130 (as shown in FIG. 1). The sensor 105 includes a memory 205, a processor 215, a communication interface 235, and a transceiver 220 including a transmitter circuitry 225 and a receiver circuitry 230. The processor 215 includes one or more microprocessors, microcontrollers, DSPs (digital signal processors), state machines, logic circuitry, or any other device or devices that process information based on operational or programming instructions. Such operational or programming instructions are stored in the memory 205. The memory 205 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing non-transitory digital information. One of ordinary skill in the art will recognize that when the processor 215 has one or more of its functions performed by a state machine or logic circuitry, the memory 205 containing the corresponding operational instructions can be embedded within the state machine or logic circuitry. The operations performed by the processor 215 and the other elements of the sensor 105 are described in detail below.

The transmitter circuitry 225 and the receiver circuitry 230 enable the sensor 105 to communicate communication messages in the communication network 100. In this regard, the transmitter circuitry 225 and the receiver circuitry 230 include appropriate, conventional circuitry to enable digital or analog transmissions over a wireless communication channel. The implementations of the transmitter circuitry 225 and the receiver circuitry 230 depend on the implementation of the sensor 105. For example, the transmitter circuitry 225 and the receiver circuitry 230 can be implemented as an appropriate wireless modem, or as conventional transmitting and receiving components of two-way wireless communication devices. In the event that the transmitter circuitry 225 and the receiver circuitry 230 are implemented as a wireless modem, the modem can be internal to sensor 105 or insertable into the sensor 105 (e.g., embodied in a wireless radio frequency (RF) modem implemented on a Personal Computer Memory Card International Association (PCMCIA) card). For a wireless sensor, the transmitter circuitry 225 and the receiver circuitry 230 are implemented as part of the wireless device hardware and software architecture in accordance with known techniques. One of ordinary skill in the art will recognize that most, if not all, of the functions of the transmitter circuitry 225 and the receiver circuitry 230 can be implemented in a processor, such as the processor 215. However, the processor 215, the transmitter circuitry 225 and the receiver circuitry 230 have been artificially partitioned herein to facilitate a better understanding.

In accordance with some embodiments, the sensor operates in the promiscuous mode in which the receiving circuitry 230 of the sensor 105 receives all the communication messages communicated on the wireless communication channels within the range 130 of the sensor 105. In accordance with another embodiment, the sensor 105 forwards the communication message received through the receiving circuitry 230 to the access points 110-$n$ through the communication interface 235.

As illustrated in FIG. 2, the memory 205 stores and maintains a sensor table 210. The sensor table 210 stores an identifier of each communication message received by the sensor 105 on the wireless communication channels within the range of the sensor 105, an identifier of a destination access point 110-$n$ of each communication message received by the sensor 105, an identifier of a source station 125-$n$ of each communication message received by the sensor 105, a number of retransmissions of each communication message received by the sensor 105, and a status of each communication message received by the sensor 105. The sensor table 210 of the sensor 105 is described in detail below. In accordance with some embodiments, the memory 205 of the sensor 105 also stores the predetermined threshold value that can be different for different stations 125 in the communication network 100.

The processor 215 compares the number of retransmissions of a communication message to the predetermined threshold value. Based on the result of comparison, the processor 215 determines whether to instruct the communication interface 235 to forward the communication message to a destination access point 110-n through the wired link 115-n (as shown in FIG. 1) or not. The communication interface 235 is coupled to the processor 215 and is linked to the access points 110-n in the communication network 100 through wired links 115-n. In accordance with some embodiments, the processor 215 on determining that the number of retransmissions is equal to or greater than the predetermined threshold value instructs the communication interface 235 to forward the communication message to the destination access point 110-n. Accordingly, the processor 215 refrains from instructing the communication interface 235 to forward the communication message to the destination access point 110-n through the wired link 115-n when the number of retransmissions of the communication message is less than the predetermined threshold value. In accordance with some embodiments, the predetermined threshold value is different for different stations 125-n.

Figure 3:
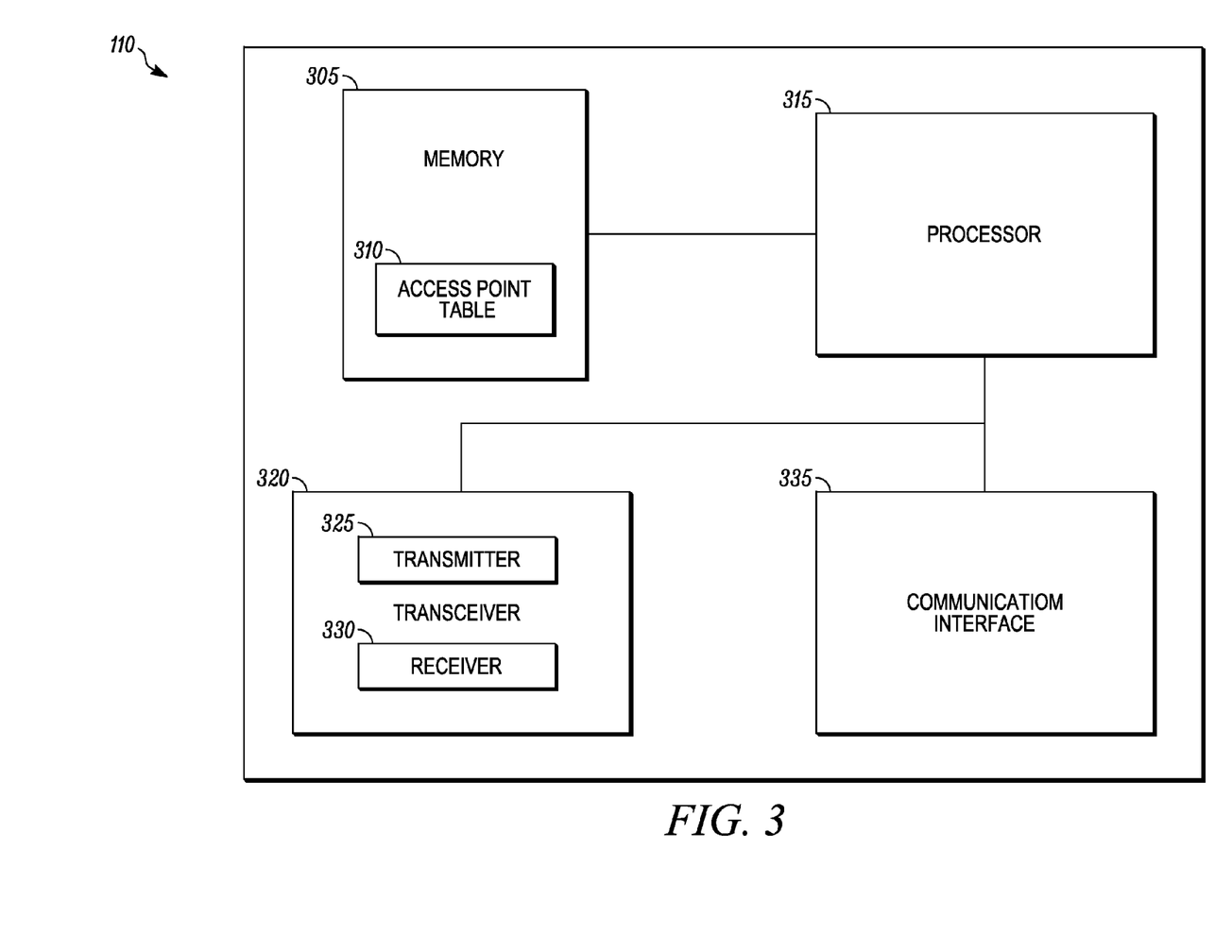
FIG. 3 is a block diagram of an access point operating in the communication network of FIG. 1 in accordance with some embodiments.

FIG. 3 is a block diagram of the access point 110-n deployed in the communication network 100 in accordance with some embodiments. The access point 110-n in the communication network 100 is configured to receive the communication messages from the stations 125-n located in its coverage area to forward the communication message to a destination station 125-n. The access point 110-n includes a memory 305, a processor 315, a communication interface 335, and a transceiver 320 including a transmitter circuitry 325 and a receiver circuitry 330. Although not shown, the access point 110-n also can include an antenna switch, duplexer, circulator, or other highly isolative means (not shown) for intermittently providing radio signals from the transmitter circuitry 325 to the antenna (not shown) and from the antenna to the receiver circuitry 330.

The processor 315 includes one or more microprocessors, microcontrollers, DSPs (digital signal processors), state machines, logic circuitry, or any other device or devices that process information based on operational or programming instructions. Such operational or programming instructions are stored in the memory 305. The memory 305 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing non-transitory digital information. One of ordinary skill in the art will recognize that when the processor 315 has one or more of its functions performed by a state machine or logic circuitry, the memory 305 containing the corresponding operational instructions can be embedded within the state machine or logic circuitry. The operations performed by the processor 315 and the other elements of the access point 110-n are described in detail below.

The transmitter circuitry 325 and the receiver circuitry 330 enable the access point 110-n to communicate communication messages and receive communication messages to and from the stations 125-n. In accordance with some embodiments, the communication message can be a data message, a control message, a voice message, or a voice quality data message. In this regard, the transmitter circuitry 325 and the receiver circuitry 330 include appropriate, conventional circuitry to enable digital or analog transmissions over a wireless communication channel. The implementations of the transmitter circuitry 325 and the receiver circuitry 330 depend on the implementation of the access point 110-n. For example, the transmitter circuitry 325 and the receiver circuitry 330 can be implemented as an appropriate wireless modem, or as conventional transmitting and receiving components of two-way wireless communication devices. In the event that the transmitter circuitry 325 and the receiver circuitry 330 are implemented as a wireless modem, the modem can be internal to the access point 110-n or insertable into the access point 110-n (e.g., embodied in a wireless radio frequency (RF) modem implemented on a Personal Computer Memory Card International Association (PCMCIA) card). For a wireless access point, the transmitter circuitry 325 and the receiver circuitry 330 are implemented as part of the wireless device hardware and software architecture in accordance with known techniques. One of ordinary skill in the art will recognize that most, if not all, of the functions of the transmitter circuitry 325 and the receiver circuitry 330 can be implemented in a processor, such as the processor 315. However, the processor 315, the transmitter circuitry 325 and the receiver circuitry 330 have been artificially partitioned herein to facilitate a better understanding.

The receiver circuitry 330 is capable of receiving communication packets from the stations 125-n over the wireless link 120-n in the coverage area of the access point 110-n. The transmitter circuitry 325 is capable of transmitting an acknowledgment to the stations 125-n on receiving the communication packet from the stations 125-n. The transmitter circuitry 325 is further capable of forwarding the communication message to the destination station 125-n over the wireless link 120-n. Further, the communication interface 335 is capable of receiving a communication packet from the sensor 105 via the wired link 115-n. In accordance with some embodiments, the communication interface 335 receives only the retried communication packets from the sensor 105 through the wired link 115-n.

As illustrated in FIG. 3, the memory 305 stores and maintains an access point table 310. The access point table 310 is a region of memory 305 used to store an identifier of each communication message received by the access point 110-n and an identifier of a source station 125-n of the communication message. The access point table 310 also stores information that indicates whether an acknowledgment was sent to the source station 125-n or not (on receiving the communication message). The access point table 310 is explained in detail with reference to FIG. 5.

In accordance with some embodiments, the processor 315 compares an identifier of each communication message received by the access point 110-n from the stations 125-n and the sensor 105 to the identifiers of the communication messages already received by the access point 110-n. Based on the result of comparison, the processor 315 determines whether the communication message was previously received by the access point 110-n or not. In accordance with some embodiments, the processor 315 instructs the transmitter circuitry 325 to send an acknowledgment to the source station 125-n of the communication message and forward the communication message to its destination station 125-n when the communication message is not previously received by the access point 110-n. In accordance with some embodiments, the processor 315 would simply ignore the communication message and does not forward the communication message to the destination station 125-n when the communication message is previously received by the access point 110-n.

Figure 4A:
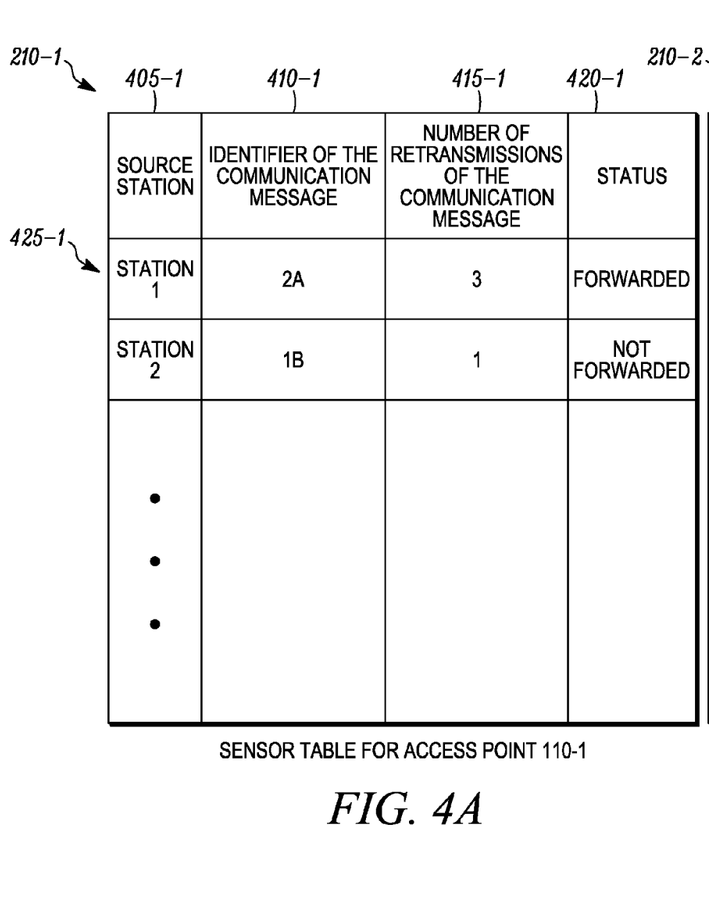
FIGS. 4A and 4B illustrate example structures of the sensor tables employed in the communication network of FIG. 1 in accordance with some embodiments.
Figure 4B:
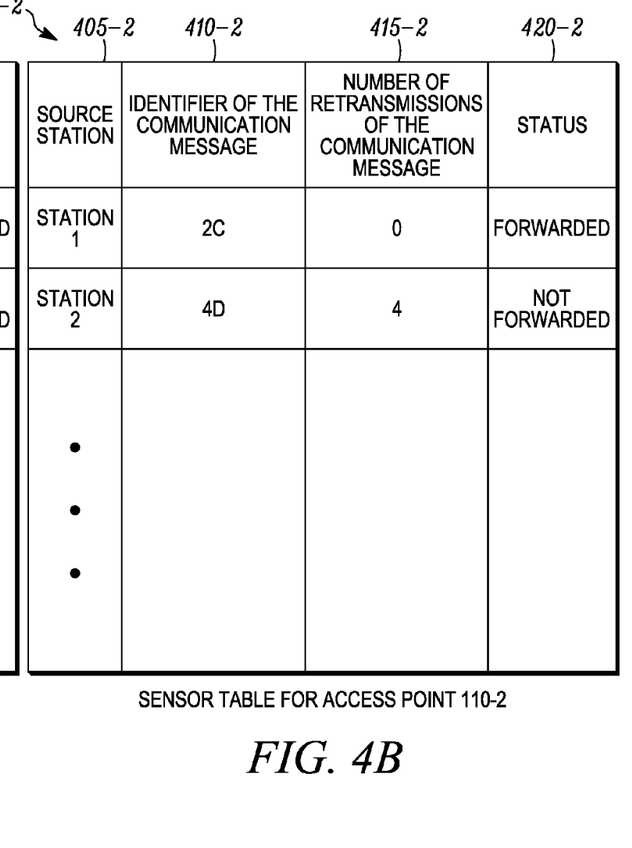

FIGS. 4A and 4B illustrate structures of the sensor tables 210-n employed in the sensor 105 for storing an identifier of each communication message received by the sensor 105. In accordance with some embodiments, the sensor 105 maintains a different sensor table 210-n for different destination access points 110-*n*. The sensor table 210-*n* includes four (4) fields namely source station field 405-*n*, identifier of the communication message field 410-*n*, a number of retransmissions of the communication message field 415-*n*, and status of the communication message field 420-*n*. The source station field 405-*n* stores an identifier of a source station 125-*n* of each communication message received by the sensor 105. The identifier of the communication message field 410-*n* stores an identifier of each communication message received by the sensor 105. In accordance with some embodiments, the identifier of the communication message and the identifier of the source station 125-*n* of the communication message are included in the communication message itself. Further, the number of retransmissions of the communication message field 415-*n* stores the number of times each communication message is received by the sensor 105. In accordance with some embodiments, the sensor 105 updates the number of retransmissions corresponding to the communication message stored in the sensor table each the communication message is sensed on the wireless communication channel. Next, the status field 420-*n* stores the status of each communication message received by the sensor 105. In accordance with some embodiments, the status of communication message represents whether the communication message is previously forwarded by the sensor 105 or not to the destination access point 110-*n* through the wired link 115-*n*.

In an example shown in row 425-1 of FIG. 4A, the sensor 105 maintains a sensor table 210-1 for the destination access point 110-1 and sensor table 210-2 for the destination access point 110-2. In the sensor table 210-1 (shown in FIG. 4A), the text 'station 1' represents the source station 125-*n* of the communication message received by the sensor 105 for the destination access point 110-1, the text '2A' represents an identifier of the communication message received by the sensor 105 for the destination access point 110-1, the text '3' represents the number of retransmissions of the communication message (2A) sensed by the sensor 105, and the text 'forwarded' represents that the communication message (2A) is forwarded by the sensor 105 to the destination access point 110-1 through wired link 115-1.

Figure 5:
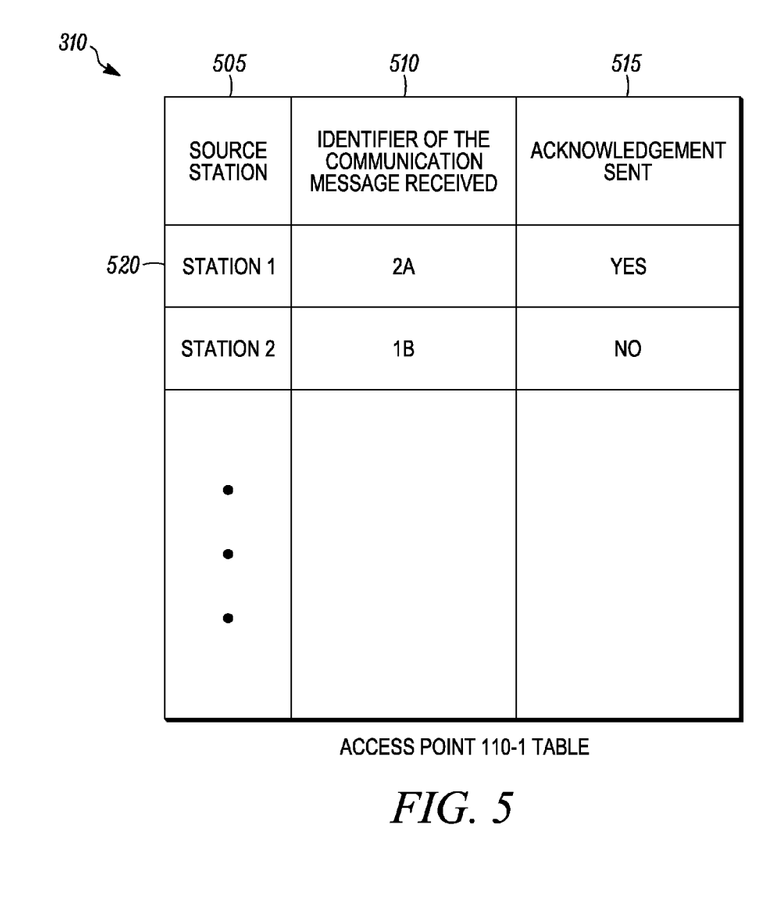
FIG. 5 illustrates an example structure of an access point table employed in the communication network of FIG. 1 in accordance with some embodiments.

FIG. 5 illustrates a structure of an access point table 310 employed in the access point 110-*n* for maintaining an identifier of the latest communication message received from an associated station 125-*n*. The access point table 310 includes three (3) fields namely source station field 505, identifier of the communication message received field 510, and an acknowledgment sent field 515. The source station field 505 stores an identifier of a source station 125-*n* of each communication message received by the access point 110-*n* through the wired link 115-*n* and the wireless link 120-*n*. The identifier of the communication message received field 510 stores an identifier of each communication message received by the access point 110-*n* through the wired link 115-*n* and the wireless link 120-*n*. The acknowledgment field 515 stores information that indicates whether an acknowledgment has been sent to the source station 125-*n* of the communication message by the access point 110-*n* through the wireless link 120-*n* or not.

In an example shown in row 520 of FIG. 5, the access point 110-*n* maintains an access point table 310 for storing information regarding each communication packet received by the access point 110-*n*. In the access point table 310 shown in FIG. 5, the text 'station 1' represents the source station of the communication message received by the access point 110-*n*, the text '2A' represents an identifier of the communication message received by the access point 110-*n*, the text 'yes' represents that an acknowledgment has been sent to the station 1 on receiving the communication message (2A).

Figure 6:
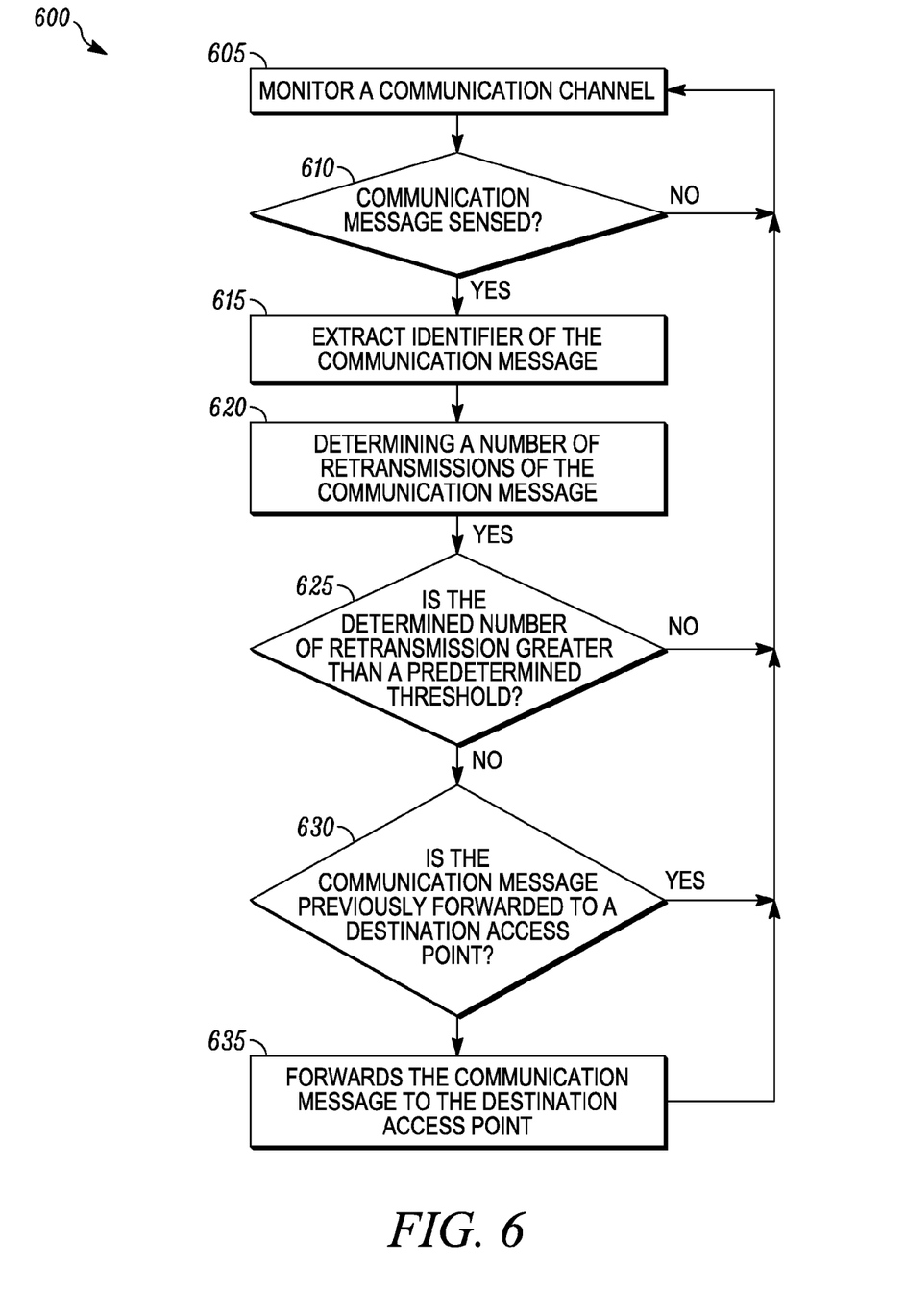
FIG. 6 is a flowchart of a method for improving quality of communication by the sensor in the communication system of FIG. 1 in accordance with some embodiments.

FIG. 6 is a flowchart of a method 600 for improving the quality of communication in a communication network 100 by the sensor 105 in accordance with some embodiments. The method 600 begins with the sensor 105 monitoring a communication channel in the communication network at 605. In accordance with some embodiments, the sensor 105 receives the communication messages transmitted in its range 130 in the communication network 100. Although not shown in the flowchart 600, the sensor 105 is capable of monitoring more than one communication channels in the communication network 100 and receiving the communication messages transmitted over the multiple communication channels in the communication. In such cases, where the sensor 105 monitors more than one communication channels in the communication network 100, the sensor 105 scans each communication channel for a particular period of time in a cyclic manner.

Next, at 610, the sensor 105 senses and receives a communication message transmitted on the wireless communication channel in the communication network. The sensor 105, at 615, on sensing a communication message on the wireless communication channel determines an identifier of the sensed communication message. The identifier of the communication message is included in the communication message itself. In accordance with some embodiments, the sensor 105 further determines an identifier of the source station 125-*n* of the communication message and an identifier of the destination access point 110-*n* of the communication message and stores the identifier of the communication message, the identifier of the source station 125-*n*, and the identifier of the destination access point 110-*n* in the sensor table 210-*n*. In accordance with another embodiment, the sensor 105 updates the number of retransmissions corresponding to the communication message in the sensor table 210-*n* each time a communication message with the same identifier is sensed on the wireless communication channel.

Returning back to 610, if the sensor 105 does not sense any communication packet on the wireless communication channel, the sensor 105 continues to monitor the wireless communication channel in the communication network 100.

Next, at 620, the sensor 105 determines the number of retransmissions of the sensed communication message. In accordance with some embodiments, the number of retransmissions of the communication message is stored in the sensor table 210-*n* and is updated each time the communication message is sensed by the sensor 105. Further, at 625, the sensor 105 compares the determined number of retransmissions of the communication message with the predetermined threshold value. The predetermined threshold value is a predetermined value stored in the memory 205 (shown in FIG. 2) of the sensor 105. In accordance with some embodiments, the predetermined threshold value can be different for different stations 125-*n* and destination access points 110-*n*. If the determined number of retransmissions of the communication message is equal to or greater than the predetermined threshold value, the sensor 105 proceeds to 630. At 630, the sensor 105 determines if the communication message is previously forwarded to the destination access point 110-*n* by the sensor 105 through the wired link 115-*n*. The information regarding whether the communication message is forwarded to the destination access point 110-*n* by the sensor 105 through the wired link 115-*n* or not is stored in the sensor table 210-*n*. In accordance with some embodiments, the sensor 105 when forwards any communication message to the destination access point 110-n, the sensor 105 updates the status of that communication message in the sensor table 210-n as "forwarded".

Next, at 635, the sensor 105 forwards the communication message to the destination access point 110-n if the communication message is not previously forwarded to the destination access point 110-n by the sensor 105 through the wired link 115-n. On the other hand, if the communication message is previously forwarded to the destination access point 110-n by the sensor 105 through the wired link 115-n, the sensor 105 updates the number of retransmissions corresponding to the communication message in the sensor table 210-n and continues to monitor the communication channel. Returning at 625, if the determined number of retransmissions of the communication message is less than the predetermined threshold, the sensor 105 continues to monitor the communication channel.

Figure 7:
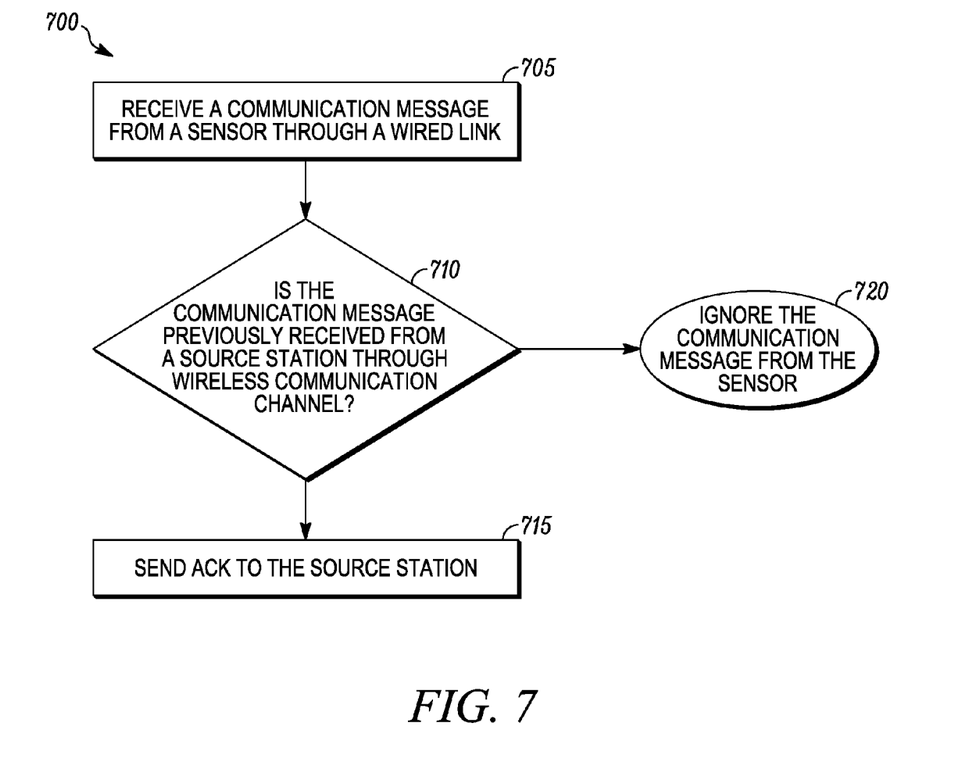
FIG. 7 is a flowchart of a method for improving quality of communication by the access point in the communication system of FIG. 1 in accordance with some embodiments.

FIG. 7 is a flowchart of a method 700 for improving quality of communication in the communication network 100 by the destination access point 110-n in accordance with some embodiments. The method 700 begins with the destination access point 110-n receiving a communication message from the sensor 105 through the wired link 115-n at 705. Next, at 710, the destination access point 110-n determines whether the communication message received by the sensor through the wired link 115-n is previously received by the destination access point 110-n from the source station 125-n through wireless link 120-n. In accordance with some embodiments, the destination access point 110-n determines an identifier of the communication message received from the sensor 105 through the wired link 115-n and compares the identifier of the communication message to the identifier of each communication message received by the destination access point 110-n through wireless link 120-n. In accordance with another embodiment, the destination access point 110-n maintains the access point table 310 (shown in FIG. 5) with identifier of latest communication message received from each station 125-n.

Next, at 715, the destination access point 110-n sends back an acknowledgment to the source station 125-n when the communication message is not previously received by the destination access point through the wired link 115-n. In accordance with some embodiments, the destination access point 110-n after sending the acknowledgment to the source station 125-n updates its access point table 310 (shown in FIG. 5). In accordance with another embodiment, the destination access point 110-n forwards the communication message to a destination station 125-n (if any) of the communication message. Returning to 710, the destination access point 110-n ignores the communication message received from the sensor 105 through the wired link 115-n when the communication message is previously received by the destination access point 110-n through the wireless link 120-n.

Figure 8:
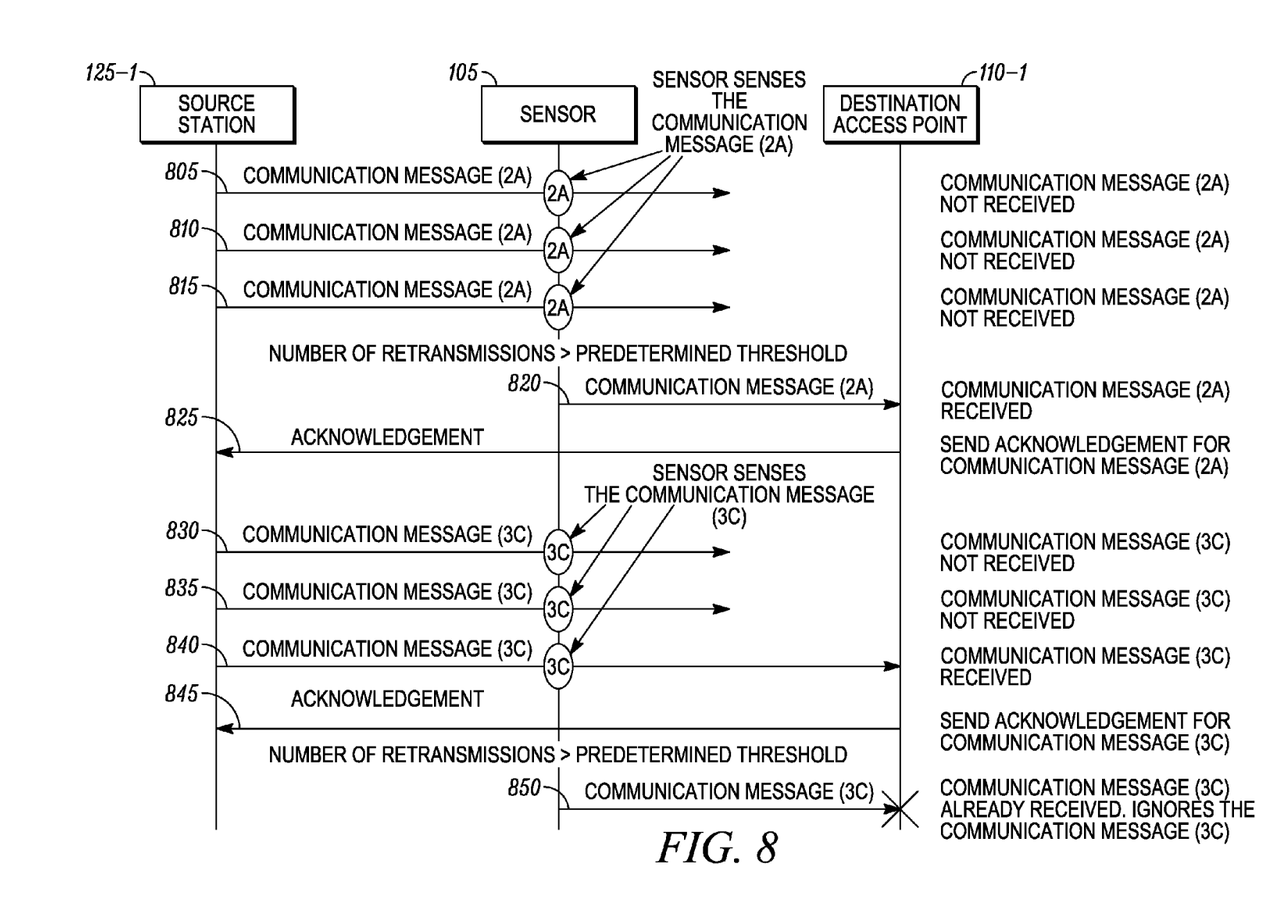
FIG. 8 is a flow diagram of a method for improving quality of communication in the communication system of FIG. 1 in accordance with some embodiments.

In an example shown in FIG. 8, the source station 125-1, at 805 sends a communication message (2A) to the destination access point 110-1 on the wireless communication channel. The sensor 105 senses the communication message (2A) on the wireless communication channel for the first time and determines an identifier of the communication message (2A), an identifier of the source station 125-1 and an identifier of the destination access point 110-1. The sensor 105 further updates its sensor table 210 (shown in FIG. 4A) with the identifier of the communication message (2A), the identifier of the source station 125-1 and the identifier of the destination access point 110-n. In this example, the destination access point 110-1 is located in an area of RF interference and is unable to receive the communication message (2A) from the source station 125-1 transmitted over the wireless communication channel. As the destination access point 110-1 is unable to receive the communication message (2A) from the source station 125-1 over wireless communication channel, the destination access point 110-1 does not send any acknowledgment back to the source station 125-1.

Next, at 810, the source station 125-1 (after waiting for a particular period of time) retransmits the same communication message (2A) to the destination access point 110-1 on the wireless link 120-1 when the source station 125-1 does not receive any acknowledgment from the destination access point 110-1. The sensor 105 senses the same communication message (2A) on the wireless communication channel and updates the number of retransmission associated with the communication message (2A) in its communication message. In this example, the number of retransmissions in the sensor table 210 for the communication message (2A) is two (2). The sensor 105 then compares the number of retransmissions of the communication message (2A) to the predetermined threshold value (i.e. three (3) in this case) stored in the sensor 105. In this example, at 815, the number of retransmissions of the communication message (2A) is two (2) which is less than the predetermined threshold value (i.e. three (3)). Therefore, the sensor 105 does not forward the communication message (2A) to the destination access point 110-1 through the wired link 115-1. In this example, the destination access point 110-1 is again unable to receive the communication message (2A) transmitted on the wireless communication channel.

Next, at 815, the source station 125-1 (after waiting for a particular period of time) retransmits the same communication message (2A) to the destination access point 110-1 on the wireless communication channel for the third time when the source station 125-1 does not receive any acknowledgment from the destination access point 110-1. The sensor 105, on sensing the communication message (2A), updates the number of retransmissions associated with the communication message (2A) in its sensor table by one. Thus, the number of retransmissions associated with the communication message (2A) is now updated to three (3). The sensor 105, at 820, compares the number of retransmissions of the communication channel (2A) to the predetermined threshold value. In this example, the number of retransmission associated with the communication message (2A) (i.e. three (3)) is equal to the predetermined threshold value, therefore the sensor 105 forwards the communication message (2A) to the destination access point 110-1 through the wired link 115-1. Further, at 825, the destination access point 110-1, on receiving the communication message (2A) from the sensor 105 sends back an acknowledgment to the source station 125-1 of the communication message (2A) so that the source station 125-1 does not retransmit the communication message (2A) on the wireless communication channel.

Continuing to 830, assume that the source station 125-1 sends a communication message (3C) to the destination access point 110-1 on the wireless communication channel. As discussed above, the sensor 105 also receives the communication message (3C) and updates its sensor table with an identifier of the communication message (3C), an identifier of the source station 125-1 and an identifier of the destination access point 110-1. Assume that the communication message (3C) does not reach the destination access point 110-1 in its first two attempts. At 835, the number of retransmissions associated with the communication message (3C) and stored in the sensor table 210 is two (2).

The source station 125-1, at 840, therefore retransmits the communication message (3C) on the wireless communication channel. Assume that the communication message (3C)

is received by the destination access point 110-1 through wireless communication channel in its third attempt. The destination access point 110-1 on receiving the communication message (3C) sends back an acknowledgment to the source station 125-1 at 845. In the mean time, the sensor 105 determines that the number of retransmissions of the communication message (3C) is equal to the predetermined threshold value and forwards the communication message (3C) to the destination access point 110-1 through the wired link 115-1. As the destination access point 110-1 has previously received the communication message (3C) over the wireless communication channel, the destination access point 110-1 ignores the communication message (3C) received from the sensor 105 at 850 and does not send back the acknowledgment to the source station 125-1 again.

The communication network 100 as described above with reference to FIGS. 1-8 prevents dropping of communication messages in the network, thereby improving the quality of communication without using the wireless links of the communication network 100. The method described above with reference to FIGS. 1-8 uses the Wireless Fidelity (WiFi) sensor technology to make the voice communication near jitter free. The method is based on the factor that the access points 110-*n* and the sensors 105 are deployed in such a way that if the access point 110-*n* located in the area of RF interference has lost a communication message, the sensor 105 is most likely to receive the same communication message for appropriate forwarding to the access point 110-*n*. The sensor 105 will act as relay in addition to the normal functioning and passes required communication message to the access points 110-*n*.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for improving communication quality in a communication network including a plurality of access points, a plurality of stations wirelessly communicating with the plurality of access points and at least one sensor located at a different location from the plurality of access points, the method comprising:

sensing, by a sensor, a communication message on a wireless communication channel in the communication network, wherein the communication message is transmitted from a source station and destined for a destination access point;

determining, by the sensor, a number of retransmissions of the communication message from the source station;

forwarding, by the sensor, the communication message to the destination access point through a wired medium when the determined number of retransmissions of the communication message is at least equal to a predetermined threshold;

receiving, by a destination access point, the communication message from the sensor through the wired medium;

determining, by the destination access point, whether the communication message is previously received by the destination access point through a wireless communication channel; and transmitting, by the destination access point, an acknowledgement message to the source station when the communication message from the source station is not previously received by the destination access point through the wireless communication channel.

2. The method of claim 1, further comprising:

refraining, by the destination access point, from transmitting the acknowledgement message to the source station for the communication message received through the wired medium, when the communication message is previously received by the destination access point through the wireless communication channel.

3. The method of claim 2, further comprises:

refraining, by the sensor, from forwarding the communication message to the destination access point when the determined number of times is less than the predetermined threshold.

4. The method of claim 3, further comprising:

maintaining, by the sensor, a sensor table, wherein the sensor table stores an identifier of each communication message received by the sensor, an identifier of a destination access point of each communication message received by the sensor, an identifier of a source station of each communication message received by the sensor, a number of retransmissions of each communication message, and a status of each communication message received by the sensor.

5. The method of claim 4, wherein the status of each communication message represents whether the communication message is previously forwarded by the sensor or not.

6. The method of claim 1, wherein prior to forwarding the communication message to the destination access point through a wired medium further comprises:

determining, by the sensor, whether the communication message is previously forwarded to the destination access point by the sensor; and refraining, by the sensor, from forwarding the communication message to the destination access point on determining that the communication message is previously forwarded to the destination access point by the sensor.

7. The method of claim 2, wherein the predetermined threshold is different for different destination access points.

8. The method of claim 4, wherein sensing the communication message on the wireless communication channel further comprises:

updating the number of retransmissions corresponding to the communication message stored in the sensor table each time the communication message is sensed on the wireless communication channel.

9. A sensor for improving quality of communication in a communication network including a plurality of access points, a plurality of stations wirelessly communicating with the plurality of access points, the sensor comprising:

a transceiver configured to:

monitor a wireless communication channel in the communication network;

a processor communicatively coupled to the transceiver, the processor configured to:

sense a communication message on the wireless communication channel, wherein the communication message is transmitted from a source station and destined for a destination access point, and determine a number of retransmissions of the communication message from the source station; and a communication interface communicatively coupled to the processor, the communication interface configured to:

forward the communication message to the destination access point through a wired medium when the determined number of retransmissions of the communication message is at least equal to a predetermined threshold, such that the destination access point can determine whether the communication message was previously received by the destination access point through a wireless communication channel and can transmit an acknowledgement message to the source station when the communication message from the source station is not previously received by the destination access point through the wireless communication channel, and wherein the sensor is located at a different location from the plurality of access points.

10. The sensor as claimed in claim 9, wherein the processor is further configured to:

refrain from forwarding the communication message to the destination access point when the determined number of retransmissions is less than the predetermined threshold.

11. The sensor as claimed in claim 9, further comprising:

a sensor table coupled to the processor, the sensor table configured to store an identifier of each communication message received by the sensor, an identifier of a destination access point of each communication message received by the sensor, an identifier of a source station of each communication message received by the sensor, a number of retransmissions of each communication message, and a status of each communication message received by the sensor.

12. The sensor as claimed in claim 9, wherein the processor is further configured to:

determine whether the communication message is previously forwarded to the destination access point by the sensor; and refrain from forwarding the communication message to the destination access point on determining that the communication message is previously forwarded to the destination access point by the sensor.

13. The sensor as claimed in the claim 11, wherein the processor is further configured to:

update the number of retransmissions corresponding to the communication message stored in the sensor table each time the communication message is sensed on the wireless communication channel.

* * * * *